Dec. 26, 1967   D. PALMER-PERSEN   3,360,708
COMBINATION BATTERY AND RECHARGER
Filed Aug. 23, 1965   2 Sheets-Sheet 1

INVENTOR.
DAVID PALMER-PERSEN
BY Joseph F. Cole
ATTORNEY

Dec. 26, 1967   D. PALMER-PERSEN   3,360,708
COMBINATION BATTERY AND RECHARGER
Filed Aug. 23, 1965   2 Sheets-Sheet 2

INVENTOR.
DAVID PALMER-PERSEN
BY Joseph F. Cole
ATTORNEY

United States Patent Office 3,360,708
Patented Dec. 26, 1967

3,360,708
COMBINATION BATTERY AND RECHARGER
David Palmer-Persen, Hillsborough, Calif., assignor to En-Power Company, Inc., San Mateo, Calif., a corporation of California
Filed Aug. 23, 1965, Ser. No. 481,654
2 Claims. (Cl. 320—2)

ABSTRACT OF THE DISCLOSURE

A combination battery and recharger having a rechargeable battery forming a self-contained first component part and a recharging circuit unit providing a self-contained second component part independent of the first component part. These component parts may be coupled together in one position for use as a battery, or coupled together in another position so as to recharge the battery upon plugging the recharging unit into a suitable source of alternating current.

It is a well known fact that there are two basic types of electric cells. One is the "primary cell," also known as the "dry cell" which is discharged once and then discarded, for example, the common flashlight battery. The other type is the "secondary" or rechargeable, for example, the nickel-cadmium cell, and once its storage capacity is depleted it can be regenerated through the application of an electric current in the direction opposite to the cell's discharge, and it is then ready again to provide electric current.

An object of this invention is to provide a combination battery and recharger consisting of two main components: a rechargeable battery cell and a recharging circuit unit. When these two components are arranged in coupled relation in one position, they are ready for use as a battery defining negative (—) and positive (+) terminals.

However, when these two components are coupled together in another position, the recharging circuit unit may be plugged into a suitable source of alternating current, for instance, a wall plug supplying 110 volts. This will recharge the battery cell, and the cycle may be repeated many times during the life of the battery cell.

Another obect of the invention is to provide a combination battery and recharger in which the two main components may be readily connected in either of their two positions, all with facility and ease.

Other objects and advantages will appear as the specifiication continues. The novel features of the invention will be pointed out in the appended claims.

Drawings

For a better understanding of the invention, reference should be had to the accompanying drawings, forming part of this specification, in which.

While I have shown only the preferred embodiment of my invention, it should be understood that various changes, or modifications, may be made within the scope of the appended claims without departing from the spirit thereof.

Detailed description

Figure 9:
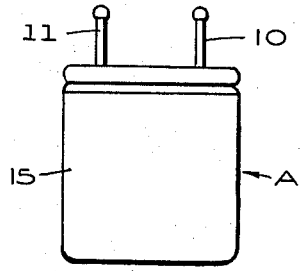
Figure 10:
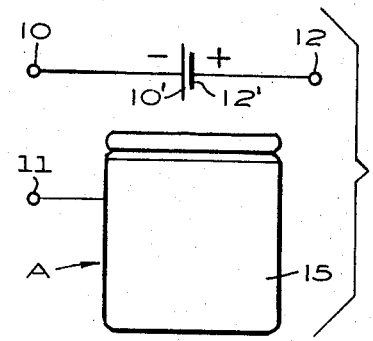
FIG. 10 is a schematic view showing the circuit for the battery.

Referring now to the drawings in detail, it will be noted that a rechargeable battery A defines a sealed case 15 having an anode (+) or positive electrode 12' and a cathode (—) or negative electrode 10' therein. In addition, of course, the case contains a suitable electrolyte. As disclosed in FIGS. 8 and 9 of the drawings, prongs 10, 11 and 12 are carried by the top of the battery case and project upwardly therefrom. The case 15 provides a negative (—) terminal 17 when the components are assembled for use as a battery in the manner illustrated in FIGS. 1 and 2, the second component consisting of a recharging circuit unit designated generally at B. Moreover, FIGS. 2 and 10 disclose that the cathode (—) is connected to the prong 10, while the anode (+) is connected to the prong 12. The prong 11 is connected to the case 15. Also, the battery has a pair of rectangular sockets 1 and 2 formed in its top, but these sockets have no electrical connections—they merely serve to receive a pair of power blades 1' and 2' of the recharging circuit unit B in the manner hereinafter described, these power blades being shown in FIG. 1 as extending downwardly into the sockets 1 and 2.

Figure 1:
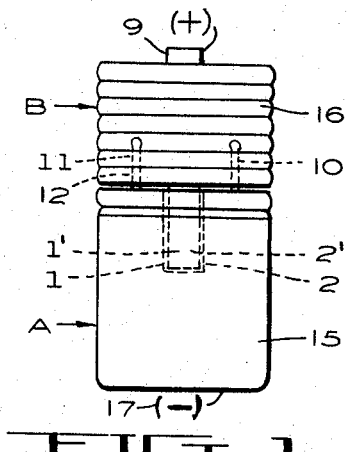
FIG. 1 is a side elevational view of a rechargeable battery having the recharging circuit unit coupled thereto for use as a battery.
Figure 3:
FIG. 3 is an elevational view with the recharging circuit unit inverted and coupled to the battery for use in recharging the latter.

In its structural features, the recharging circuit unit B has a housing 16 made to be coupled to the battery A in either of two positions, these positions being shown in FIGS. 1 and 3 of the drawings. The case 15 and the recharging circuit unit B define the negative (—) terminal 17 and a positive (+) terminal 9, respectively, when the unit B is coupled to the top of the battery A in the position shown in FIG. 1.

Figure 2:
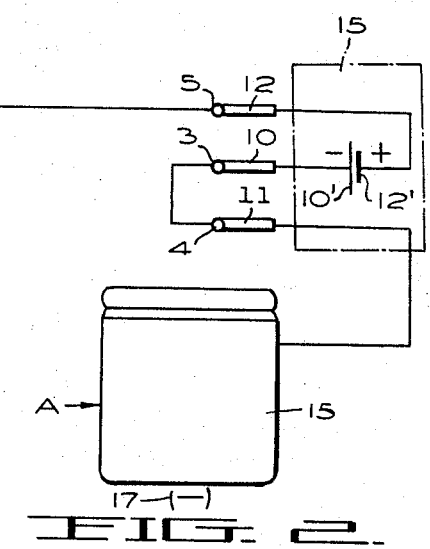
FIG. 2 is a wiring diagram showing the circuit when the components are coupled together as it FIG. 1.
Figure 7:
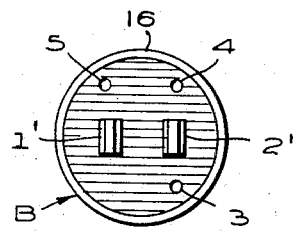

As illustrated in FIGS. 2 and 7, the bottom of the unit B is provided with sockets 3, 4 and 5 that are adapted to removably receive the prongs 10, 11 and 12, respectively, when the unit B is coupled to the top of the battery A, as in FIG. 1. The socket 5 is connected to the positive (+) terminal 9, while the sockets 3 and 4 are connected in series (see FIG. 2).

Figure 4:
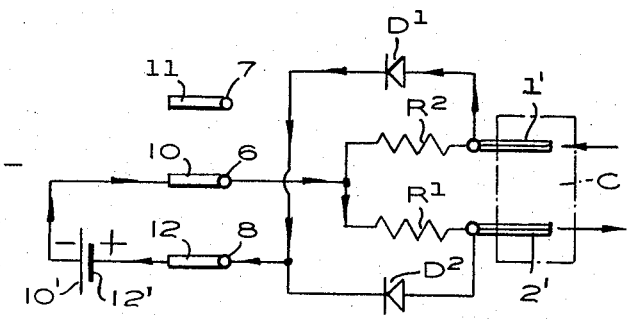
FIG. 4 is a wiring diagram showing the recharging circuit when the components are coupled together as in FIG. 3, with the incoming alternating current flowing in one direction.
Figure 4A:
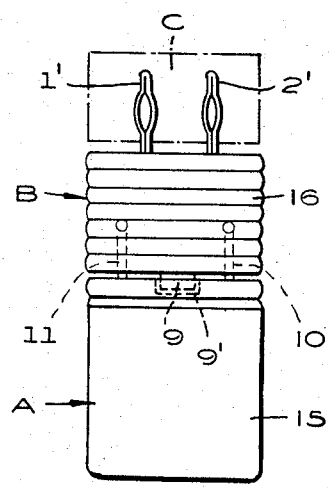
FIG. 4A is a view similar to FIG. 4, but showing the flow of the alternating current when the flow of the latter is reversed.
Figure 4A:
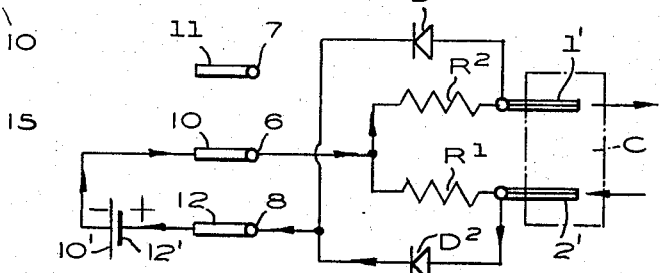
Figure 5:
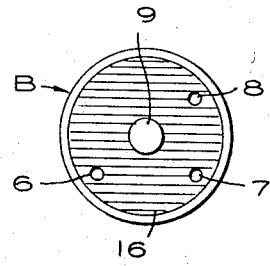
FIGS. 5, 6 and 7 are top plan, side elevational, and bottom plan views, respectively, of the recharging circuit unit.

It will be noted from FIGS. 5 and 4 and 4A that the top of the unit B is provided with sockets 6, 7 and 8 that are adapted to receive the prongs 10, 11 and 12, respectively, when the unit B is inverted and then coupled to the top of the battery A, as in FIG. 3 of the drawing, i.e., the components occupy a battery recharging position. Socket 7 is a dummy with no electrical contact.

The recharging circuit unit B houses a recharging circuit that is shown in detail in FIGS. 4 and 4A. This circuit is made to be connected to a suitable source of alternating current, for instance 110 volts, by inserting the power blades 1' and 2' into a wall plug C, or the like. This circuit is operable for converting the alternating current into direct current for recharging the battery cell A.

When the alternating current is flowing to the circuit over the power blade 1', as in FIG. 4, it passes to a diode or rectifier $D^1$ and thence to the socket 8 as shown by the arrows in FIG. 4. The prong 12 that is inserted into the socket 8 is connected electrically to the anode (+) of the battery A and this current then flows to the cathode (—) internally of the battery, i.e., in a direction to recharge the battery. This cathode (—) is connected electrically to the prong 10 that is inserted into the socket 6, and the direct current thus produced will flow through a voltage-dropping resistor $R^1$ to the power blade 2'. At this time, diode or rectifier $D^2$ blocks flow of current from the socket 8 to the power blade 2'. A further voltage-dropping resistor $R^2$ is arranged between the socket 6 and the power blade 1'.

Upon reversing of the direction of flow of the incoming alternating current, the latter will enter the circuit through the power blade 2', as shown in FIG. 4A, passing through diode or rectifier $D^2$, continuing through socket 8 and prong 12 to the anode (+) 12', and thence to the cathode (—) 10'. From the latter, the direct current will flow through prong 10, socket 6, voltage-dropping resistor $R^2$ to the power blade 1'. Flow of current from socket 8 to the power blade 1' at this time is blocked by the diode or rectifier $D^1$, causing return flow through resistor $R^2$.

Thus the recharging direct current always flows in the same direction through the battery cell A, as will be apparent by comparing FIGS. 4 and 4A of the drawings.

The recharging circuit unit B is mounted on the top of the battery cell A, when this unit is arranged in either of its two positions, i.e., for use as a battery (FIG. 1) or in battery-recharging position (FIG. 3).

Figure 8:
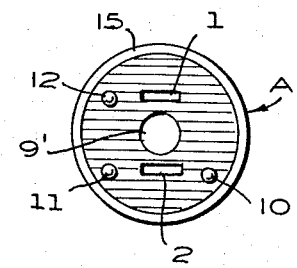
FIGS. 8 and 9 are top plan and side elevational views, respectively, of the rechargeable battery.
Figure 6:
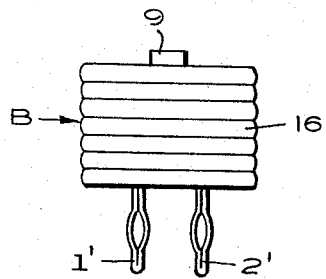

It will be observed from FIGS. 3 and 8 that the battery cell A is provided with a recess 9' in the top thereof and disposed to receive and accommodate the positive (+) terminal 9 but without electrical connection therebetween, when this unit B is inverted into battery-recharging position. Also, when the unit B is mounted in battery-forming position (FIG. 1), the power blades 1' and 2' merely fit into the sockets 1 and 2 of the battery cell, respectively, but without electrical connection with the battery.

I claim:
1. In a combination battery and recharger:
   (a) a rechargeable battery forming a self-contained first component part and defining a case having an anode (+) and a cathode (—) therein;
   (b) a recharging circuit unit forming a self-contained second component part independent of the first component part and having a housing made to be removably coupled to the battery in either of two positions;
   (c) the case and the recharging circuit unit defining negative (—) and positive (+) terminals, respectively, when the unit is coupled to the battery case in one of said positions for use as a battery;
   (d) a recharging circuit housed in said unit and having power blades made to be connected to a source of alternating current, the circuit including means operable for converting said current to direct current;
   (e) and this circuit being connected to the anode (+) and the cathode (—) for flow of the direct current from the former to the latter internally of the battery to recharge the battery, when the unit is coupled to the battery case in the other of said positions.

2. In a combination battery and recharger:
   (a) a rechargeable battery defining a case having an anode (+) and a cathode (—) therein;
   (b) a recharging circuit unit having a housing defining opposite ends, and each of these ends being made to be selectively coupled to the top of the battery case;
   (c) the case and recharging circuit unit defining negative (—) and positive (+) terminals, respectively, when one end of the unit is coupled to the battery case in one end position for use as a battery;
   (d) a recharging circuit housed in said unit and having power blades projecting upwardly therefrom, when this unit is inverted and the other end thereof is coupled to the battery case in another end position;
   (e) the circuit including the power blades which are made to be connected to a source of alternating current, and the circuit further including means operable for converting said current to direct current, and this circuit being connected to the anode (+) and the cathode (—) for flow of the direct current from the former to the latter internally of the battery to recharge the battery, when the unit is coupled to the battery in the latter position;
   (f) the battery being provided with a plurality of prongs projecting upwardly from its top;
   (g) the underneath end of the recharging circuit unit having a plurality of sockets therein disposed to have preselected of said prongs removably inserted thereinto, when the unit is disposed on the top of the battery case in battery-forming position;
   (h) certain of the prongs and sockets being electrically connected in series into the battery circuit between the cathode (—) and the negative (—) terminal of the battery when in battery-forming position;
   (i) and another prong and its socket being electrically connected into the battery circuit between the anode (+) of the battery and the positive (+) terminal of the unit when in battery-forming position.

References Cited
UNITED STATES PATENTS

| 3,028,536 | 4/1962 | Bilsky | 320—2 |
| 3,120,632 | 2/1964 | Hopt et al. | 320—2 |
| 3,270,267 | 8/1966 | Nolte | 320—56 |

JOHN F. COUCH, *Primary Examiner.*

S. WEINBERG, *Assistant Examiner.*